No. 760,450. PATENTED MAY 24, 1904.
A. E. HALL.
CLOTHES LINE REEL AND STRETCHER.
APPLICATION FILED DEC. 4, 1903.
NO MODEL.
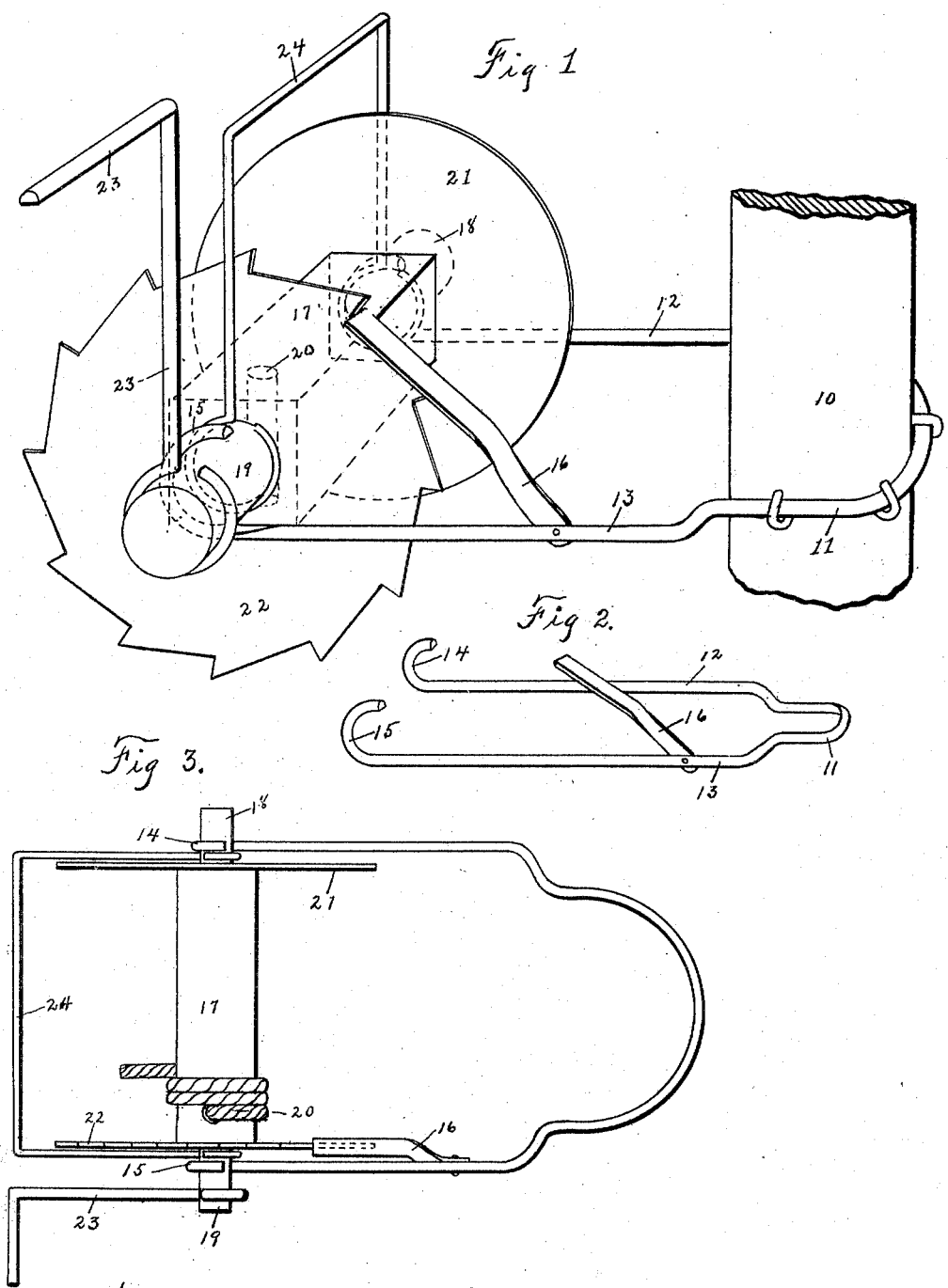
Witnesses
Frank Tate,
E. Reynolds
Inventor
Andy E. Hall,
By Jill G Roe, Atty.

No. 760,450.     Patented May 24, 1904.

UNITED STATES PATENT OFFICE.

ANDY E. HALL, OF EAGLEGROVE, IOWA.

CLOTHES-LINE REEL AND STRETCHER.

SPECIFICATION forming part of Letters Patent No. 760,450, dated May 24, 1904.

Application filed December 4, 1903. Serial No. 183,788. (No model.)

*To all whom it may concern:*

Be it known that I, ANDY E. HALL, a citizen of the United States, residing in Eaglegrove, county of Wright, and State of Iowa, have invented a new and useful Improvement in Clothes-Line Reels and Stretchers, of which the following is a specification.

The object of my invention is to provide a reel and stretcher for a clothes-line of simple, strong, and durable construction which may be easily and quickly operated and which may be detached from its fastenings for the purpose of removing the line within doors when not in use, and thus protecting it from the weather.

My invention consists of certain details of construction hereinafter set forth, pointed out in my claim, and illustrated in the accompanying drawings, in which—

Figure 1 shows a perspective view of my device secured to a post. Fig. 2 shows a detail view of the frame I employ, and Fig. 3 shows a plan view of my device.

Referring to the accompanying drawings, reference-numeral 10 is used to indicate a post to which is secured a frame 11, said frame being shaped so as to provide two forwardly-projecting arms 12 and 13, each of which is provided at its outer extremity with a hook 14 and 15, respectively.

The numeral 16 indicates a dog pivotally secured to the frame 13 and designed to operate in connection with a ratchet-wheel hereinafter described.

The numeral 17 indicates a shaft having its two ends 18 and 19 cylindrical in shape and designed to be received by the hooks 14 and 15 in the frame 11, and the numeral 20 indicates a channel extending transversely through said shaft.

The numeral 21 indicates a solid wheel, designed as a guide-wheel, mounted upon one end of the shaft 17, and the numeral 22 indicates a ratchet-wheel mounted upon the other end of the shaft 17, said wheel being designed to operate in connection with the dog 16 on the frame 11.

The numeral 23 indicates a crank rigidly attached to one end of the shaft 17, and the numeral 24 indicates a wire frame designed as a bail loosely attached to the shaft 17.

In practical operation in putting up the clothes-line one end of the line is secured to a hook, and then the operator carries the reel by the bail and walks to the frame where secured to the post, as hereinbefore described, and places the reel on the framework by means of the hooks 14 and 15 fitting over and engaging cylindrical ends 18 and 19 of the shaft 17. He then operates the crank and tightens the line to such a degree as is desirable, and it is obvious that the line cannot become loosened by reason of the dog 16 engaging the ratchet-wheel and holding it wherever placed. In taking down the line the operator raises the dog from the ratchet-wheel and lifts the reel from the frame and walks to the point where the other end of the line is secured, turning the crank, and thus obviously winding the line about the shaft 17 and within the guide-wheel 21 and the ratchet-wheel 22.

Having thus described my invention, what I claim, and desire to secure by Letters Patent of the United States, is—

In a clothes-line reel and stretcher the combination of a frame provided with two forwardly-projecting arms, a hook on the forward end of each arm forming a bearing, a dog pivotally mounted on one of said arms; a reel mounted in the bearings of said arms, an opening extending transversely through the shaft of said reel; a guide-wheel and a ratchet-wheel secured to the ends of the shaft, the ratchet-wheel being designed to operate in connection with the dog; a frame designed as a bail loosely secured to the ends of the shaft and a crank rigidly affixed to the said shaft, all arranged and combined substantially as and for the purposes stated.

ANDY E. HALL.

Witnesses:
FRANK STEINER,
E. REYNOLDS.